June 28, 1966 A. A. HOLLINGSWORTH 3,258,271
FLUID-TIGHT JOINT
Filed July 29, 1963 2 Sheets-Sheet 1

INVENTOR
ALBERT A. HOLLINGSWORTH
BY Raphael Semmes
ATTORNEY

United States Patent Office 3,258,271
Patented June 28, 1966

3,258,271
FLUID-TIGHT JOINT
Albert A. Hollingsworth, Anniston, Ala., assignor to Woodward Iron Company, Woodward, Ala., a corporation of Delaware
Filed July 29, 1963, Ser. No. 298,197
9 Claims. (Cl. 277—1)

This invention relates to a fluid-tight mechanical joint for sections of pipe or conduit, and consists more particularly in new and useful improvements in a sealing gasket comprising a hollow, annular ring of elastic material adapted to be filled and inflated hydraulically with a suitable material in liquid form at the time of introduction, but which will harden to form a permanent set.

An object of the invention is to provide a mechanical joint of this type designed to form an effective gas and liquid tight connection which will afford ample deflection, expansion, contraction and has sufficient rigidity to meet the various requirements of pipe lines and conduits.

Another object of the invention is to provide an inflatable gasket designed for use as an effective seal in joint connections for conventional cast iron pipe, such as used in conducting sewage, waste, water, gases, etc.

A further object of the invention is to provide a gasket of this character which represents an improvement over the conventional poured and/or caulked joints using such materials as lead, sulphur, lead sulphur compounds, cement, and other packing materials, the present invention being particularly adaptable for use as a joint seal in connection with what are conventionally referred to in the trade as cast iron soil pipe and fittings.

Heretofore, various attempts have been made to devise inflatable gaskets of this general nature by providing means whereby the gaskets could be inflated by the use of injection needles or probe devices, and, in some instances, the walls of the gaskets have embodied thickened areas provided with slits through which the probe devices were inserted. However, while these arrangements were feasible to some extent where the gaskets were to be inflated with air or gas and even liquids under low pressures, there has been a tendency for filling materials, such as contemplated in the present invention, to ooze out through the openings left by the probe device or through the slits provided in the wall of the gasket, when pressures of any magnitude were employed. In other words, none of the prior devices with which I am familiar have embodied a gasket of the type shown and described herein, including means for positively controlling and regulating the pressure under which the fill material may be introduced and maintained within the gasket.

It is therefore an important object of the present invention to overcome these disadvantages and to provide a fluid-tight gasket for insertion between the mating surfaces of two sections of pipe or the like, and designed to receive a mass of filling material introduced under pressure and which is liquid when injected into the gasket, but becomes solid under normal conditions of use of said gasket.

Another object of the invention is to provide a gasket of this character having vent means for exhausting air from the gasket and means associated with the vent means for positively controlling the pressure developed in the gasket during its inflation.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 1:
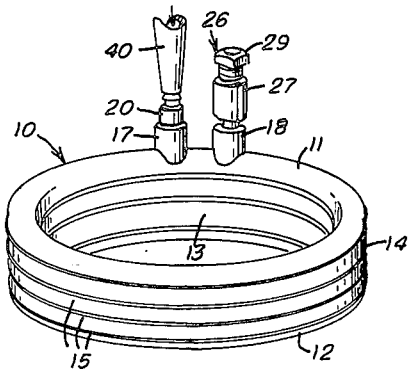
FIG. 1 is a perspective view of a gasket formed in accordance with the present invention.
Figure 2:
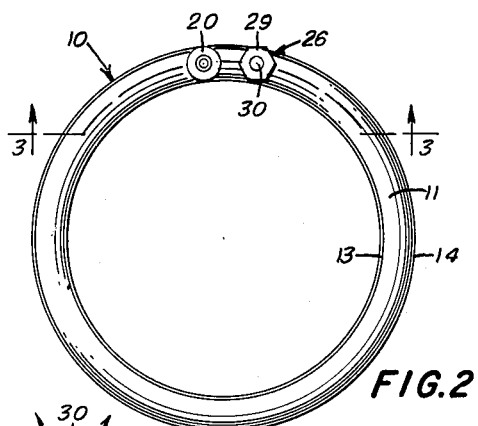
FIG. 2 is a plan view of one end wall of the gasket showing the arrangement of values.
Figure 3:
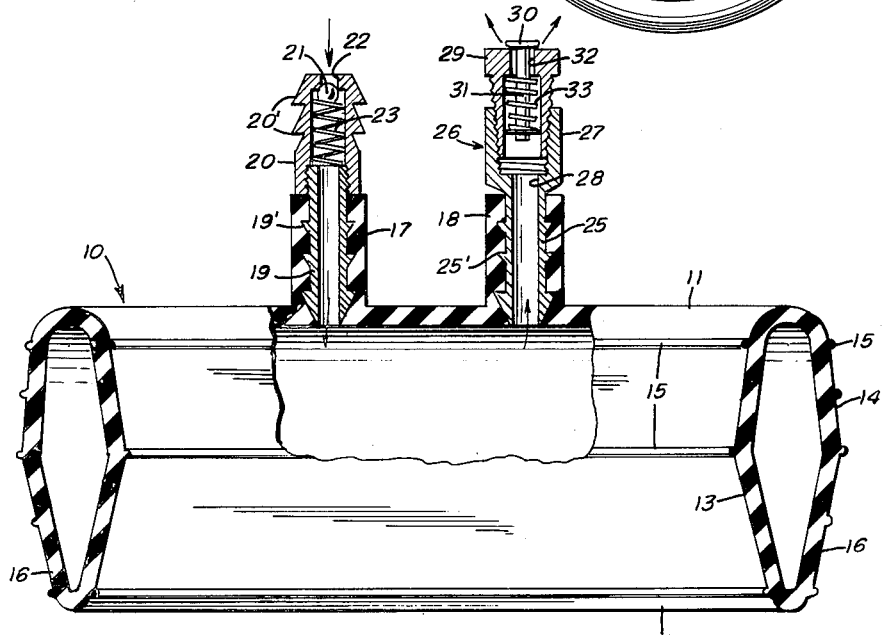
FIG. 3 is an enlarged fragmentary view, partially in section, taken on line 3—3 of FIG. 2, showing the portion of the gasket containing the valves.

In the drawings, referring first to FIGS. 1–3, the gasket is generally indicated by the numeral 10 and comprises an annular, hollow ring of elastic, inflatable material, such as plastic, rubber, or other suitable composition having the desired strength and properties of flexibility. The gasket is preferably substantially oval in cross-section as seen in FIG. 3, having end walls 11 and 12 and side walls 13 and 14, and, in the preferred form of the invention, the exposed peripheries of the side walls 13 and 14 are provided with a series of parallel ribs or ridges 15 which facilitate the sealing engagement of the gasket when assembled. Also, as shown in FIG. 3, the cross-sectional profile of the gasket is preferably designed to provide a narrowing or tapering of the walls 13 and 14 from the medial portion of the gasket to the end wall 12, as at 16, to facilitate the insertion of the gasket in the joint, as will later appear.

The outer end wall 11 is provided at annularly spaced points with tubular inlet and vent necks 17 and 18 respectively, which are integral with the gasket wall and communicate with the interior of the gasket. The inlet neck is designed to receive the tubular stem, either integral with or threadedly connected to an inlet valve 20. The stem 19 is preferably provided with radially projecting, annular teeth 19' which are outwardly and upwardly directed so as to positively engage the inner periphery of the neck 17 with sufficient penetration to prevent the blowing out or accidental removal of the inlet valve 20 after installation. The valve proper comprises a cylindrical housing having an internally closable ball vavle 21 controlling its inlet port 22, said ball being normally urged into sealing engagement with the port 22 by coil spring or the like 23. Preferably, the periphery of the valve cylinder 20 is provided with one or more annular teeth 20' similar to teeth 19' on the stem 19 but directed outwardly and downwardly to engage within an injector nozzle or the like.

The vent neck 18 is designed to receive the tubular stem 25 of a vent control assembly generally indicated at 26 and comprising a vent cup 27 having a central opening 28 which communicates with the upper end of the stem 25 and is internally threaded to receive the complementary external threads of a removable relief valve 29. The relief valve 29 is hollow and provided with a centrally disposed, externally closable valve member 30 having a valve stem 31 which is reciprocably mounted in valve port 32. The valve port 32 is slightly larger in diameter than the valve stem 31 to provide a vent clearance, and the valve proper, which closes externally of the port, is normally urged in closed position by coil spring 33 surrounding the stem 31. As will later appear, the spring 33 is designed to maintain the valve member 30 in closed position until a predetermined maximum pressure is reached within the gasket 10, whereupon the valve opens to permit the bleeding of fill material from the gasket.

As in the case of the stem 19 of inlet valve 20, the stem 25 of the vent valve assembly 26 is provided with projecting annular teeth 25' to prevent the displacement of the vent assembly 26 with respect to the neck 18.

Various filling materials may be employed in the inflation of the gasket 10, provided they have characteristics which enable their introduction in liquid form and chemical setting in the absence or presence of air, and which will give no off vapors nor require external heat to facilitate setting. A suitable preparation for this purpose may comprise an epoxy fill material, such as epichlorohydrin reacted with bisphenol-A. Other fill materials may be epoxy novolacs, polyesters, phenolics, melamines, and polyurethane-epoxy foam.

Figure 4:
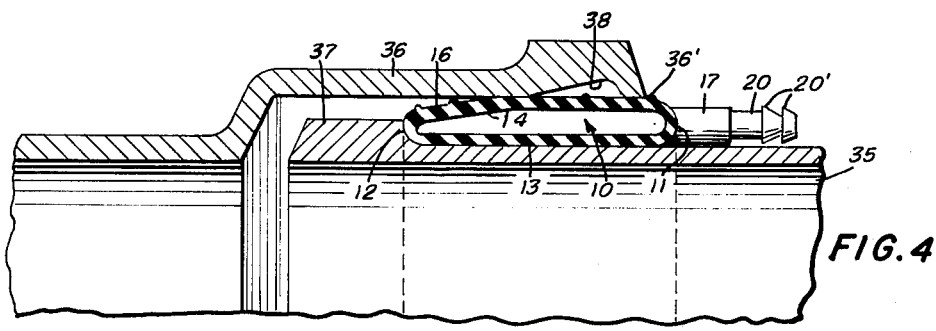
FIG. 4 is a sectional view showing the gasket of the present invention in the course of installation between the bell and spigot ends of adjoining pipe sections of one form.

Turning now to FIG. 4 which illustrates one form of installation embodying the gasket of the present invention, the numerals 35 and 36 respectively represent the spigot and hub ends of two adjacent pipe sections to be joined. The spigot and hub are of conventional design, the spigot being of the type provided with an annular rim 37 on the end, and the hub or bell having a diameter sufficiently larger than that of the spigot and rim 37 to permit ready insertion of the spigot in the hub and provide an annular space for normally receiving a quantity of packing material to be inserted in the joint. The inner periphery of the hub 36 is conventionally provided with an annular groove 38, spaced inwardly from its open end and designed to receive the packing material employed in the joint. As will later appear, the outer wall 14 of the gasket of the present invention coacts with this annular groove in effecting a seal and preventing blowing out or displacement of the gasket.

In the use of the present invention, the deflated gasket 10 is slipped over the end of the spigot section 25 by stretching it over the end rim 37, if such rim is employed, and inserted in the hub 36 along with the spigot. As previously explained, the inner edge of the gasket is preferably tapered as at 16 which facilitates the insertion of the gasket through the end opening 36' of the hub 36, and as shown in FIG. 4, the outer edge wall 11 is slightly exposed through the opening 36' with the inlet and vent elements projecting axially alongside the periphery of the spigot section 35. At this point, the outer side wall 14 of the gasket slidably engages the inner periphery of the hub 36 but does not enter the annular groove 38 of the hub.

Figure 5:
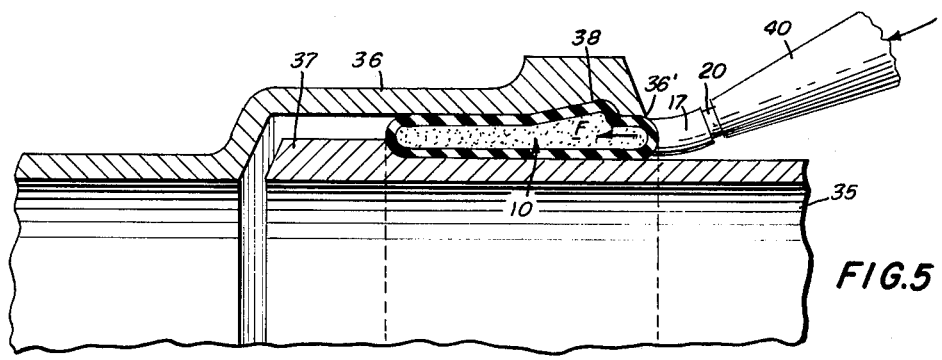
FIG. 5 is a similar view showing the gasket inflated.

After the spigot and gasket have been inserted to the proper extent within the hub as shown in FIG. 5, an injection nozzle or conduit 40, leading from a source of filling material (not shown), is slipped over the end of inlet valve 20 and its internal surface is engaged by the annular teeth 20'. Before the introduction of filling material is started, the valve 29 is removed from the vent cup 27, and as the filling material F is injected through the valve 20 and neck 17 into the interior of the gasket 10, any air in the gasket is vented through neck 18 and vent cup 27 until the gasket is completely filled with material, as indicated by the appearance of material in the vent. The relief valve 29 is then screwed into the cup 27 and, as previously pointed out, this valve is preset so as to be responsive to pressures exceeding a predetermined limit, preferably in excess of 50 lbs. per square inch. The injection of filling material is not continued until the predetermined pressure has been attained and the valve member 30 opens against the tension of spring 33, permitting filling material to escape. The relief valve is thus an indicator that the desired pressure has been reached, and as soon as filling material begins to escape through the valve 29, the injection is stopped.

Under the force of this pressure, the filling material F inflates the gasket 10 between the mating surfaces of the spigot 35 and hub 36, and a portion of the outer wall 14 of the gasket expands and tightly engages the inner periphery of the hub and is groove 38. The filling material which is liquid during the course of its injection then sets and hardens, thus providing a permanent packing which is locked in the hub in sealing contact between the latter and the spigot.

The inlet and vent valves may be allowed to remain in the packing, although after the filling material has set and hardened, these valves may be removed if desired.

Figure 6:
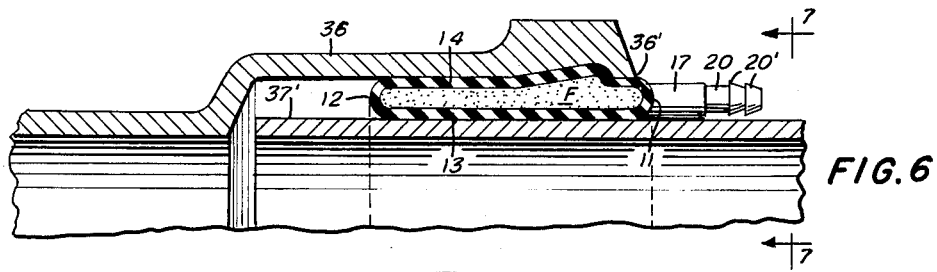
FIG. 6 is a similar view showing a modified form of spigot end.
Figure 7:
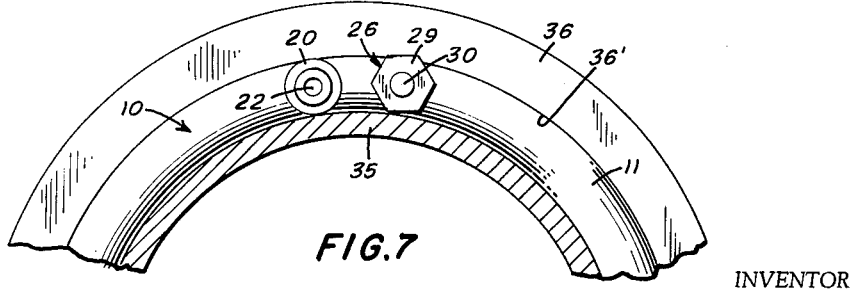
FIG. 7 is a sectional view of the joint shown in FIG. 6, taken on line 7—7 of the latter.

The foregoing description relates to the type of spigot having an end rim 37, but, as previously explained, this gasket may be used with a plain end spigot as at 37' in FIG. 6. Otherwise, the embodiment shown in FIG. 6 is the same as that just described.

It will be apparent that the present invention provides a continuous inflatable gasket or ring which may be easily slipped over the end of the spigot and inserted in the hub with the spigot. After once assembled and inflated with filling material, the escape of such material is prevented by the valve arrangement described and hardens into a permanent joint, sealed with a compressed elastomeric seal. One of the important features of the invention resides in the fact that no rings or other special devices are required to hold the gasket in place, as the gasket, when inflated with hydraulic pressure, conforms to the locking features of the hub, and the filling material sets up or hardens so as to prevent the gasket or mating pipe ends from movement longitudinally, while at the same time, providing ample deflection, expansion and contraction.

Another important feature resides in the combination with the proper fill material of the valve means to facilitate its introduction and control its pressure. In other words, if water were used as an ingredient of the filling mixture, there would be a problem of its disposal when the filling material dried, and if asphalt were used, for example, it would shrink and loose the required pressure for maintaining a proper joint. The present invention adequately meets these problems and provides a highly effective packing device.

From the foregoing, it is believed that the invention may be readily understood by those skilled in the art without further description, it being borne in mind that numerous changes may be made in the details disclosed without departing from the spirit of the invention as set forth in the following claims.

I claim:

1. A fluid-tight packing device for insertion between the mating surfaces of the hub and spigot ends of two adjacent pipe sections, comprising, in combination, an annular, hollow ring of inflatable material, a mass of material filling said ring which is liquid when injected into the ring, but solid under normal conditions of use of said packing device, an internally closable inlet valve in the outer end wall of said ring, communicating with the interior thereof, means normally closing said valve, a vent control assembly in said outer end wall, spaced from said inlet valve and communicating with the interior of said ring, an externally closable relief valve in said assembly, means normally closing said relief valve and responsive to a predetermined internal pressure in said ring for permitting the opening of said relief valve.

2. In a pipe joint for the hub and spigot ends of two adjacent pipe sections, wherein the hub is provided with an internal annular groove spaced inwardly from its open end, an annular, hollow ring of inflatable material insertable between the mating surfaces of said hub and spigot ends, a mass of material filling said ring which is liquid when injected into the ring, but solid under normal conditions of use of said joint, an internally closable inlet valve in the outer end wall of said ring, communicating with the interior thereof, means normally closing said valve, a vent control assembly in said outer end wall, spaced from said inlet valve and communicating with the interior of said ring, an externally closable relief valve insertable in said assembly, means normally closing said relief valve and responsive to a predetermined internal pressure in said ring for permitting the opening of said relief valve, whereby upon the attainment of said predetermined internal pressure, said mass of filling material causes the inflation of said ring and the engagement of the outer side wall thereof with the annular groove in said hub.

3. A fluid-tight packing device for insertion between the mating surfaces of the hub and spigot ends of two adjacent pipe sections, comprising, in combination, an annular, hollow ring of inflatable material, a mass of material filling said ring which is liquid when injected into the ring, but solid under normal conditions of use of said packing device, an inlet neck integral with and projecting axially from the outer end wall of said ring, an internally closable inlet valve mounted in said inlet neck, means normally closing said valve, a vent neck adjacent said inlet neck and spaced therefrom, integral with and projecting axially from said outer end wall, an externally closable relief valve insertable in said vent neck, means normally closing said relief valve and responsive to a predetermined internal pressure in said ring for permitting the opening of said relief valve.

4. A fluid-tight packing device for insertion between the mating surfaces of the hub and spigot ends of two adjacent pipe sections, comprising, in combination, an annular hollow ring of inflatable material, an internally closable inlet valve in the outer end wall of said ring, communicating with the interior thereof, means normally closing said valve, vent means in said outer end wall, spaced from said inlet valve and communicating with the interior of said ring, whereby upon the introduction of filling material in said ring through said inlet valve, air is permitted to escape through said vent means until the ring has been completely filled with filling material, and an externally closable relief valve insertable in said vent means, means normally closing said relief valve and responsive to a predetermined internal pressure on the fill material in said ring for permitting the opening of said relief valve to indicate that said predetermined internal pressure has been attained.

5. A fluid-tight packing device for insertion between the radially spaced mating surfaces of the hub and spigot ends of two pipe sections, comprising an annular, hollow ring of inflatable material adapted to embrace the spigot end of one pipe section and insertable therewith through the open end of the hub of another pipe section, the forward edge of said ring, when deflated, being reduced in cross-sectional profile to facilitate insertion in the space between said hub and spigot, the opposite edge wall of said ring being provided with an internally closable inlet valve, a vent device in said opposite edge wall, spaced from said inlet valve for venting air from said ring during introduction of filling material through said inlet valve, and an externally closable relief valve associated with said vent device and preset to indicate that a predetermined pressure has been attained in said ring.

6. A fluid-tight packing device for insertion between the mating surfaces of the hub and spigot ends of two adjacent pipe sections, comprising, in combination, an annular, hollow ring of inflatable material, a tubular inlet neck integral with and projecting axially from the outer end wall of said ring, an internally closable inlet valve permanently mounted in said inlet neck, means normally closing said valve, a tubular vent neck adjacent said inlet neck and spaced therefrom, integral with and projecting axially from said outer end wall, a vent cup communicating with the interior of said ring, permanently mounted in said vent neck, whereby upon the introduction of filling material in said ring through said inlet valve, air is permitted to escape through said vent cup until the ring has been completely filled with filling material, and an externally closable relief valve insertable in said vent cup, means normally closing said relief valve and responsive to a predetermined internal pressure on the fill material in said ring for permitting the opening of said relief valve to indicate that said predetermined internal pressure has been attained.

7. In a pipe joint for the hub and spigot ends of two adjacent pipe sections, an annular, hollow ring of inflatable material insertable between the mating surfaces of the said hub and spigot ends with one end wall thereof exposed through the space between the open end of said hub and the periphery of said spigot, a mass of material filling said ring which is liquid when injected into the ring, but solid under normal conditions of use of said joint, an internally closable inlet valve in the exposed end wall of said ring, projecting axially of said ring, means normally closing said inlet valve, a vent device in said exposed end wall of said ring, spaced from said inlet valve and projecting axially of said ring, whereby upon the introduction of filling material in said ring through said inlet valve, air is permitted to escape through said vent device until the ring has been completely filled with filling material, and an externally closable relief valve insertable in said vent device, means normally closing said relief valve and responsive to a predetermined internal pressure on the filling material in said ring for permitting the opening of said relief valve to indicate that said predetermined internal pressure has been attained.

8. A pipe joint as claimed in claim 7, wherein said vent device comprises a vent tube fixed to and communicating with the interior of said ring, a vent cup attached to the outer end of said tube and internally threaded to receive complementary threads on said relief valve.

9. A method of inflating an annular, hollow gasket inserted between the mating surfaces of the hub and spigot ends of two adjacent pipe sections, one end wall of said gasket being exposed at the open end of said hub, an internally closable inlet valve in said exposed end wall and a vent device adjacent to and spaced therefrom; said method comprising the steps of introducing through said inlet valve a mass of filling material which is liquid when injected into the gasket, but solid under normal conditions of use of said gasket, continuing the introduction of said filling material until all air has been exhausted from said gasket through said vent device and said filling material appears in said vent device, inserting in said vent device an externally closable relief valve which is preset for response to a predetermined internal pressure in said gasket, and resuming the introduction of said filling material until said relief valve is actuated and filling material exits therefrom.

References Cited by the Examiner

UNITED STATES PATENTS

| | | | |
|---|---|---|---|
| 632,442 | 9/1899 | Byle et al. | 277—34 X |
| 2,306,160 | 12/1942 | Freyssinet | 277—34 |
| 2,309,974 | 2/1943 | Miller | 277—34 |
| 2,815,966 | 12/1957 | House | 277—34 |

SAMUEL ROTHBERG, *Primary Examiner.*